UNITED STATES PATENT OFFICE.

LEONARD PAGET, OF NEW YORK, N. Y., ASSIGNOR TO THE EGYPTIAN LACQUER MANUFACTURING COMPANY, OF NEW JERSEY.

PROCESS OF PREPARING PYROXYLINE SOLVENTS AND THEIR PRODUCTS.

SPECIFICATION forming part of Letters Patent No. 495,263, dated April 11, 1893.

Application filed March 1, 1893. Serial No. 464,165. (No specimens.)

*To all whom it may concern:*

Be it known that I, LEONARD PAGET, a citizen of the United States, residing at New York city, county and State of New York, have invented a new and useful Process of Preparing Pyroxyline Solvents and their Products, to be used for thin solutions of pyroxylines and other varnishes, of which the following is a specification.

My invention is of an improved process of making a methyl-amyl-acetate-benzine solvent of pyroxyline and of the product of the process which has properties superior to those of a mere mixture of methyl alcohol, amyl acetate, and benzine, or of a mixture of methyl and amyl acetates and benzine.

In following my process I mix crude amyl alcohol, or fusel-oil, with methyl alcohol, or wood-alcohol (such as is used in the pyroxyline art) in the proportions of, say, two to five volumes of wood alcohol and eight to five volumes of fusel oil with one to two volumes of benzine. I treat this mixture with chloride of calcium or an equivalent dehydrating substance to remove any water that the ingredients may have contained. I then distill this dehydrated mixture of the alcohols and benzine with acetic acid (or an equivalent acetate) in the proportion of about one volume of acetic acid to three to four volumes of the mixture. The distillate is a stronger and more active solvent of pyroxyline than is a mixture of methyl acetate and amyl acetate and benzine made by mere mixture. And I find that I may substitute ethyl-alcohol for the amyl-alcohol and obtain a powerful solvent of pyroxyline by following the same process. And I find that I may employ a mixture of amyl-alcohol, methyl-alcohol, and ethyl-alcohol in about equal parts with benzine in the proportion of about one-eighth to one-twelfth of the volume of this mixture with similar results, when following the same process. Also I find that I may substitute oil of turpentine or benzole for benzine; and that the distillate is, and that these distillates are all solvents of the ordinary gums used in varnishes, and that such gums (as for instance shellac) may be substituted for, or used with, pyroxyline. Neither do I find the proportions I have given a necessary limitation of the process.

What I claim, and desire to secure by Letters Patent, is—

1. The herein-described process of preparing a solvent of pyroxyline by first mixing methyl-alcohol, amyl-alcohol, and benzine; secondly, dehydrating the mixture; and thirdly distilling the mixture with acetic acid, substantially as described.

2. The herein-described process of preparing a solvent of pyroxyline by first mixing two or more primary alcohols with a suitable hydrocarbon; secondly, dehydrating the mixture; thirdly, distilling the mixture with acetic acid or its equivalent, substantially as described.

3. The improved solvent which consists of a distillate of two or more primary alcohols, a suitable hydrocarbon, and acetic acid, substantially as described.

4. The improved solvent which consists of a distillate of methyl and amyl alcohols, benzine, and acetic acid, substantially as described.

LEONARD PAGET.

Witnesses:
C. L. BORGMEYER,
ARCHIBALD YOUNG.